(12) United States Patent
Reczek et al.

(10) Patent No.: US 12,511,605 B2
(45) Date of Patent: Dec. 30, 2025

(54) APPARATUS AND METHOD FOR LINE HAUL LOGISTICS MANAGEMENT

(71) Applicant: PITT-OHIO, Pittsburgh, PA (US)

(72) Inventors: Christina Reczek, Pittsburgh, PA (US); Scott Greacen, Pittsburgh, PA (US)

(*) Notice: Subject to any disclaimer, the term of this patent is extended or adjusted under 35 U.S.C. 154(b) by 0 days.

(21) Appl. No.: 18/426,217

(22) Filed: Jan. 29, 2024

(65) Prior Publication Data
US 2025/0245603 A1 Jul. 31, 2025

(51) Int. Cl.
*G06Q 10/083* (2024.01)
*G06Q 10/1093* (2023.01)

(52) U.S. Cl.
CPC ....... *G06Q 10/083* (2013.01); *G06Q 10/1097* (2013.01)

(58) Field of Classification Search
CPC ...... G06Q 10/083; G06Q 50/40; G06Q 50/60; G06Q 10/087; G06Q 10/0841; G06Q 10/0843; G06Q 10/08365; G06Q 30/0633; G06Q 30/0635; G06Q 10/1097
See application file for complete search history.

(56) References Cited

U.S. PATENT DOCUMENTS

| | | | |
|---|---|---|---|
| 10,984,368 B2 | 4/2021 | Williams | |
| 11,276,255 B2 * | 3/2022 | Bradley | G01C 21/188 |
| 11,379,790 B2 | 7/2022 | Dearing | |
| 11,526,834 B2 * | 12/2022 | Conlon | G08B 7/06 |
| 11,537,767 B2 * | 12/2022 | Fuerst | G08G 1/0145 |
| 2006/0235739 A1 * | 10/2006 | Levis | G06Q 10/08 |
| | | | 705/1.1 |
| 2019/0156283 A1 | 5/2019 | Abebe | |
| 2021/0312356 A1 * | 10/2021 | Higashide | G05D 1/0217 |
| 2022/0147925 A1 * | 5/2022 | Chiang | G06Q 10/06315 |

(Continued)

FOREIGN PATENT DOCUMENTS

WO 2022/204352 A1 9/2022

OTHER PUBLICATIONS

Indian Manufacturing News, "3SC Solutions introduces ITMS, the ultimate transportation management solution.", New Delhi, Sep. 26, 2023.*

Primary Examiner — Nathan Erb
(74) Attorney, Agent, or Firm — Caldwell Intellectual Property Law

(57) ABSTRACT

An apparatus and method for line haul logistics management, the apparatus including a processor and a memory communicatively connected to the processor. The memory includes instructions configuring the processor to receive a transport request including transport data, generate projected transportation data based on the transport data, receive progress data associated with the transport, calculate a deviation index based on the projected transportation data and the progress data, determine an updated transport schedule as a function of the deviation index, generate a user interface data structure including the updated transport schedule and the progress data, and transmit the updated transport schedule and the user interface data structure. The apparatus also includes a GUI communicatively connected to the processor configured to receive the user interface data structure including the updated transport schedule and the progress data and display the updated transport schedule.

14 Claims, 7 Drawing Sheets

(56) References Cited

U.S. PATENT DOCUMENTS

| | | | |
|---|---|---|---|
| 2022/0290999 A1* | 9/2022 | Asam | G06Q 10/02 |
| 2022/0358437 A1 | 11/2022 | Rorro | |
| 2023/0096163 A1* | 3/2023 | Narayanam | G06Q 30/04 |
| | | | 705/7.25 |
| 2023/0169447 A1* | 6/2023 | Vaidyanathan | G06Q 10/083 |
| | | | 705/7.28 |

* cited by examiner

APPARATUS AND METHOD FOR LINE HAUL LOGISTICS MANAGEMENT

FIELD OF THE INVENTION

The present invention generally relates to the field of line hauls. In particular, the present invention is directed to an apparatus and method for line haul logistics management.

BACKGROUND

Modern transport providers have many transports that need to be tracked and these transport providers need to allocate resources for these transports accordingly. Current systems for tracking transports are lack efficiency and are susceptible to human error.

SUMMARY OF THE DISCLOSURE

In an aspect, an apparatus for line haul logistics management includes a processor and a memory communicatively connected to the processor. The memory includes instructions configuring the processor to receive a transport request for a transport, the transport request comprising transport data associated with the transport and the transport request, generate projected transportation data based on the transport data, receive progress data associated with the transport, calculate a deviation index based on the projected transportation data and the progress data, determine an updated transport schedule as a function of the deviation index, generate a user interface data structure including the updated transport schedule and the progress data, and transmit the updated transport schedule and the user interface data structure. The apparatus also includes a graphical user interface (GUI) communicatively connected to the processor configured to receive the user interface data structure including the updated transport schedule and the progress data and display the updated transport schedule and the progress data as a function of the user interface data structure.

In another aspect, a method for line haul logistics management is provided. The method includes receiving, by at least a processor, a transport request for a transport, the transport request comprising transport data, generating, by the at least a processor, projected transportation data based on the transport data, receiving, by the at least a processor, progress data associated with the transport, calculating, by the at least a processor, a deviation index based on the projected transportation data and the progress data, determining, by the at least a processor, an updated transport schedule as a function of the deviation index, generating, by the at least a processor, a user interface data structure including the updated transport schedule and the progress data, transmitting, by the at least a processor, the updated transport schedule and the user interface data structure, receiving, by a graphical user interface (GUI), the user interface data structure including the updated transport schedule and the progress data, and displaying, by the GUI, the updated transport schedule and progress data as a function of the user interface data structure.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
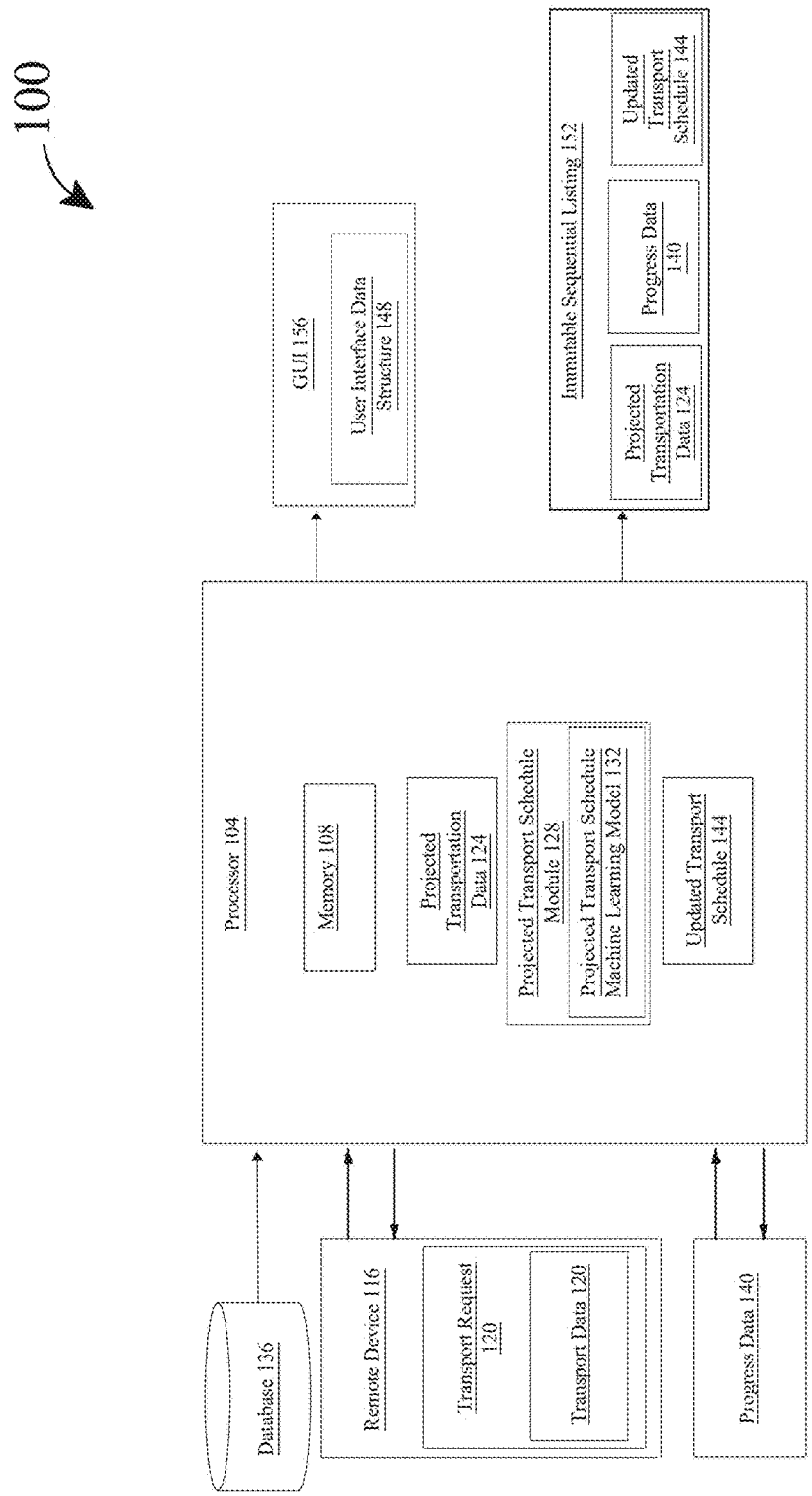
FIG. 1 is a block diagram of an exemplary embodiment of an apparatus for line haul logistics management in accordance with one or more embodiments of the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for line haul logistics management. In various embodiments, systems and methods for line haul logistics management may be used to track movement of transports between stations and/or couriers (e.g., origin courier and destination courier) and output an alert of potential issues associated with the transports.

Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

In some embodiments, apparatuses and methods described herein may generate, evaluate, and/or utilize digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for line haul logistics management is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor 104/module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, a computing device and/or apparatus 100 may include a memory 108. Memory 108 may include any memory as described in this disclosure. Memory 108 may be communicatively connected to processor 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Memory 108 may be configured to provide instructions to processor 104, which may include any processor as described in this disclosure.

With further reference to FIG. 1, memory 108 contains instructions configuring processor 104 to receive a transport request 112. In one or more embodiments, transport request may be transmitted by a remote device 116. For the purposes of this disclosure, a "remote device" is a device located remote to apparatus. Remote device 116 may include a user device, such as, for example, a customer device. Remote device 116 may include a smartphone, mobile phone, laptop computer, desktop computer, tablet, any of computing device and/or system described in this disclosure, and the like.

Still referring to FIG. 1, in one or more embodiments, transport request 112 may include an electronic communication from a customer, where a customer includes any person or company that purchases transportation of a good. For example, and without limitation, a customer may include a manufacturer requesting that a good, such as and without limitation, wood, may be moved from a first location, a wood provider, to a second location, and building owned by the manufacturer which is where the wood will be processed. For the purposes of this disclosure, a "transport request" is a communication requesting transportation of a good. For example, and without limitation, a transport request may include a communication from a vendor detailing that there is a shipment ready for delivery and that the vendor needs to schedule a delivery time at a supplier facility. In various embodiments, transport request 112 may be a text, email, generated form, answered prompt, voice recording, video instruction, and the like. Transport request 112 may include textual, audio, or visual data and/or information. In one or more embodiments, transport request 112 may include transport data 120 related to a good (e.g., product), a destination, a time, and the like. As used in this disclosure, "transport data" are details related to a shipment of goods. In one or more embodiments, transport data 120 may include details such as a quantity of shipments included in the delivery, departure location, destination location, good characteristics (e.g., parts and/or items to be included in each shipment and associated quantity and size of each part included), equipment needed for the transport, and the like.

Continuing to refer to FIG. 1, as used in this disclosure, a "transport" is the movement of a good from an initial location to a destination. In one or more embodiments, a transport may include transportation of a good using, for example, a transport vehicle. A "transport vehicle" as used in this disclosure is a machine capable of moving one or more objects between one or more locations. In some embodiments, a transport vehicle may include, but is not limited to, a freight carrier, a truck, a car, a boat, a plane, a motorcycle, and the like. A transport vehicle may be configured to operate through, but is not limited to, air, land, sea, and the like. A transport vehicle may be configured to engage in one or more steps of a transport. In some embodiments, a transport vehicle may engage in pickup, delivery, and/or line haul operations. In some embodiments, a transport vehicle may include, but is not limited to, Less than Truckload ("LTL") and/or Full Truckload ("FTL") freight delivery. In various embodiments, a transport vehicle may be controlled and/or operated by an operator. An "operator," for the purposes of this disclosure, is a person that uses a transport vehicle. The transport vehicle may be used to transport objects from one location to another. Objects may include, as non-limiting examples, cargo, goods, produces, livestock, non-fungible goods, fungible goods, produce, cargo containers, oil, liquids, gasoline, food, meals, people, and the like.

With continued reference to FIG. 1, processor 104 is configured to generate projected transportation data 124 based on the transport data 120. For the purposes of this disclosure, "projected transportation data" is a forecasted characteristic and/or information related to the process of transporting cargo, which includes one or more goods, of a customer via vehicle, such as, for example, a transport vehicle. In one or more embodiments, projected transportation data 124 may include time data, vehicle data, rate data, geographic data, condition data, and the like. "Time data," for the purposes of this disclosure, is temporal information relating to the shipment of goods. In one or more embodiments, time data may include temporal information such as a date and time related to a shipment of goods. For example, and without limitation, time data may include an estimated date and time related to a departure of a transportation vehicle with goods from an initial location, and time data may also include an estimated date and time related to an arrival of a transportation vehicle with goods to a destination. Time data may also include temporal data related to estimated intermediate stops or checkpoints of transportation vehicle during the shipment of goods. For the purposes of this disclosure, "vehicle data" is data related to a transport vehicle. In another example, and without limitation, vehicle data may include vehicle data related to estimated transportation vehicles (also referred to in this disclosure as a "vehicle") that may be used to move the desired goods of a customer. Vehicle data may include a vehicle type, weight, dimensions, and the like. For the purposes of this disclosure, "rate data" is data concerning an estimated rate of travel of a transport vehicle. In another example, and without limitation, in one or more embodiments, rate data includes information related to a rate of travel of a transportation vehicle moving goods desired by a customer. For example, and without limitation, rate data may include a 55-miles per hour speed of a transportation vehicle. In one or more embodiments, geographic data may include estimated environmental or terrain information. For example, and without limitation, geographic data may include an estimated gradient of a surface that transportation will travel along, such as a road. Geographic data may also include a road type, such as asphalt, dirt, and the like. In one or more embodiments, condition data may include information related to a surrounding environment during transportation of the transport and transportation vehicle such as weather data. In another example, and without limitation, condition data may include a road condition, such as icy, snow-covered, wet, and the like. In an embodiment, processor 104 may be configured to determine a projected transport schedule based on the projected transportation data 124. As used in this disclosure, "projected transport schedule" is an estimated plan of travel associated with the transport and transport request. In an embodiment, determining at least one projected transport schedule based on the projected transportation data 124 may comprise determining the at least one projected transport schedule based on the projected transportation data 124 using a machine learning model. In an embodiment, the at least one projected transport schedule may comprise a plurality of stages. For example, a projected transport schedule may comprise a plurality of legs based on travel time restrictions for transport vehicles, limitation of transport vehicles, and the like. In an embodiment, projected shipping schedule may be calculated using factors to optimize shipping, such as weather, traffic data, warehouse storage data, minimization of number of transport vehicle types, times between loading and unloading goods into transportation vehicles, and the like.

Continuing to reference FIG. 1, processor 104 may use a machine learning module, such as projected transport schedule module 128, to implement one or more algorithms or generate one or more machine-learning models, such as projected transport schedule machine learning model 132, to calculate at least one projected transport schedule. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs.

Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Projected transport schedule module 128 may be used to generate projected transport schedule machine learning model 132 and/or any other machine learning model using training data. Projected transport schedule machine learning model 132 may be trained by correlated inputs and outputs of training data. Training data may be data sets that have already been converted from raw data whether manually, by machine, or any other method. Training data may include previous outputs such that projected transport schedule machine learning model 132 iteratively produces outputs. Projected transport schedule machine learning model 132 using a machine-learning process may output converted data based on input of training data. In an embodiment, analyzing the user profile comprising the plurality of user related data may include determining the projected transport schedule using a machine learning model, such as projected transport schedule machine learning model 132 generated by projected transport schedule module 128. Projected transport schedule machine learning model 132 may be trained by training data, discussed in further detail below, such as projected transport schedule training data. Projected transport schedule training data may be stored in database 136.

Still referring to FIG. 1, database 136 may be implemented, without limitation, as a relational database, a key-value retrieval database such as a NOSQL database, or any other format or structure for use as a database that a person skilled in the art would recognize as suitable upon review of the entirety of this disclosure. Database 136 may alternatively or additionally be implemented using a distributed data storage protocol and/or data structure, such as a distributed hash table or the like. Database 136 may include a plurality of data entries and/or records as described above. Data entries in a database 136 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, determining the projected transport schedule based on the projected transportation data 124 using a projected transport schedule machine learning model 132 may include receiving projected transport schedule training data. In an embodiment, projected transport schedule training data may include a plurality of projected transportation data that are each correlated to one of a plurality of projected transport itineraries. As used in this disclosure, "projected transport itineraries" are a plurality of potential transport plans available related to the transport request. For example, projected transport schedule training data may be used to show projected transportation data may indicate a particular projected transport schedule. In an exemplary embodiment, a projected transport schedule may be to avoid certain areas with difficult driving conditions, such as extreme weather indicated in condition data of the projected transportation data 124. In a further embodiment, projected transport schedule training data may also include a plurality of projected transportation data that are each correlated to one of a plurality of projected transport schedule data. In such an embodiment, projected transport schedule training data may be used show how projected transportation data may influence a particular projected transport schedule. Determining the projected transport schedule using a machine learning model may further include training a projected transport schedule machine learning model 132 as a function of projected transport schedule training data. Further, determining projected transport schedule using a machine learning model may also include determining at least one projected transport schedule using trained projected transport schedule machine learning model 132. In one or more embodiments, projected transport schedule machine learning model 132 may be iteratively trained using data received from one or more transports. For example, and without limitation, projected transport schedule machine learning model 132 may use progress data 140 (as described in further detail below) to train projected transport schedule machine learning model 132. In one or more embodiments, processor 104 may be configured to iteratively compare elements within projected transportation data 124 and progress data 140 to determine deviations which may be used to train projected transport schedule machine learning model 132. In one or more embodiment, training of projected transport schedule machine learning model 132 may require little to no human interaction wherein actual data may be received by processor and automatically used to train projected transport schedule machine learning model 132. In one or more embodiment, training of the machine learning model may allow for more accurate results such as more accurate projected transport data 124 in future iterations. In one or more embodiments, actual data such as progress data 140 may include unaccounted for variables such as car accidents, cold weather, tire degradation and the like. In an embodiments, projected transport schedule machine learning model 132 may initially account for broad variables such as time of day, speed, particular routes and the like wherein projected transport schedule machine learning model 132 may be trained on additional parameters to output more accurate results. In one or more embodiments, additional parameters may include the driver, the time of year, the weather, tire degradation and the like.

With further reference to FIG. 1, processor 104 may be configured to generate a ranked list of the at least one projected transport schedule based on adherence to the transport request. For example, processor 104 may generate an ordered list ranking each of the at least one projected transport schedules in order of estimated time of arrival and the transport request. Such a list may indicate a first projected transport schedule with a greatest adherence to the transport request, and the like. In an embodiment, processor 104 may be configured to generate an adherence score for the at least one projected transport schedule. In some embodiments, processor 104 may be configured to compare any data, such as the projected transport schedules, as described throughout this disclosure using an objective function. For instance, processor 104 may generate an objective function and an adherence score using the objective function. An "objective function" as used in this disclosure is a process of minimizing or maximizing one or more values based on a set of constraints. In some embodiments, an objective function of processor 104 may include an optimization criterion. An optimization criterion may include any description of a desired value or range of values for one or more impact factors; desired value or range of values may include a maximal or minimal value, a range between maximal or minimal values, or an instruction to maximize or minimize an impact factor. As a non-limiting example, an optimization criterion may specify that an impact factor should be within a 1% difference of an optimization criterion. An optimization criterion may alternatively request that an impact factor be greater than a certain value. An optimization criterion may specify one or more tolerances for deviation from a time of arrival in a transport request.

Still referring to FIG. 1, processor 104 is configured to receive progress data 140 associated with the transport. As used in this disclosure, "progress data" is data indicating an amount of movement of a transport towards a destination for the transport. Progress data 140 may include time progress data, distance progress data, vehicle progress data, rate progress data, geographical progress data, condition progress data, and the like. As used in this disclosure, "time progress data" is temporal information relating to the shipment of goods. For example, and without limitation, time progress data may include an amount of time traveled by the transport, an amount of travel time remaining, and the like. Time data may also include temporal data related to intermediate stops or checkpoints of transportation vehicle during the shipment of goods, such as an amount of time stopped at the intermediate stop and/or checkpoint. As used in this disclosure, "distance progress data" is information relating to the advancement of shipment of goods relating to a distance. For example, and without limitation, distance progress data may include an amount of distance traveled by the transport, an amount of travel distance to the destination remaining, and the like. As used in this disclosure, "vehicle progress data" is information relating to vehicles used in the advancement of shipment of goods. For example, and without limitation, vehicles progress data may include vehicles used to advance the shipment of transport, methods of transport used, and the like. As used in this disclosure, "rate progress data" is information relating to a rate of travel used the advancement of shipment of goods relating to a distance. For example, and without limitation, rate progress data may include maximum velocity, minimum velocity, average velocity, and the like. In one or more embodiments, geographic progress data may include environmental or terrain information encountered during travel. For example, and without limitation, geographic data may include a gradient of a surface that transportation has traveled along, such as a road. Geographic data may also include a road type, such as asphalt, dirt, and the like. In one or more embodiments, condition progress data may include information related to a surrounding environment during transportation of the transport and transportation vehicle. In another example, and without limitation, condition progress data may include a road condition, such as icy, snow-covered, wet, and the like.

With further reference to FIG. 1, progress data 140 may be collected by a sensor. In an embodiment, sensor may be an accelerometer, gyroscope, pressure sensor, gas sensor, voltmeter, and the like. In a further embodiment, sensor may include an RFID scanner. In an embodiment, progress data 140 may be generated by scanning the transport being shipped, such as scans of RFID tags at each step of the shipping schedule. Additionally, sensor may include a barcode scanner. Furthermore, sensor may include a GPS tracker. In an embodiment, progress data 140 may be generated by tracking a GPS location of the transport being shipped. Additionally, progress data 140 may include GPS location data for each transport vehicle transporting the transport. Additionally or alternatively, progress data may include GPS location data of at least one courier, such as the GPS location of a person delivering the goods.

With continued reference to FIG. 1, processor 104 is configured to determine an updated transport schedule 144 as a function of the projected transportation data 124 and the progress data 140. As used in this disclosure, "updated transport schedule" is an adjusted plan of travel associated with the transport and transport request that is adjusted based on progress of the transport. In an embodiment, determining an updated transport schedule based on the projected transportation data 124 124 and the progress data 140 may comprise determining the projected transport schedule based on the projected transportation data 124 124 and the progress data 140 using a machine learning model.

With further reference to FIG. 1, determining the updated transport schedule 144 based on the projected transportation data 124 and the progress data 140 using a machine learning model may include receiving updated transport schedule training data. In an embodiment, updated transport schedule training data may include a plurality of progress data that are correlated to one of a plurality of updated transport schedules. For example, updated transport schedule training data may be used to show progress data may be used to indicate a particular updated transport schedule. In an exemplary embodiment, an updated transport schedule may be a new route to avoid traffic congestion, an adjusted to account for previous delays, and the like. In a further embodiment, projected transport schedule training data may also include a plurality of projected transportation data and correlated progress data that are correlated to one of a plurality of updated transport schedule data. In such an embodiment, updated transport schedule training data may be used show how projected transportation data and correlated progress data may indicate a particular updated transport schedule. Determining the updated transport schedule using a machine learning model may further include training a transport schedule machine learning model 132 as a function of updated transport schedule training data. Further, determining updated transport schedule using a machine learning model may also include determining at least one updated transport schedule 144 using trained transport schedule machine learning model 132.

Still referring to FIG. 1, additionally or alternatively, determining the updated transport schedule as a function of the projected transportation data and the progress data may comprise comparing the projected transportation data 124 and the progress data and determining a deviation index based on the comparison of the transport data and the progress data. As used in this disclosure, "deviation index" is a score indicating a level of deviation of the progress data from projected transportation data 124. For example, processor 104 may be configured to determine a higher deviation index for a transport that is more off schedule and/or may have issues associated with the transport. In a further non-limiting example, processor 104 may be configured to determine a lower deviation index for a transport that is not off schedule and may not have issues associated with the transport. For example, a first transport with a deviation index of "76" may be an indication there is a greater level of deviation in the first transport than a second transport with a deviation index of "41." In an embodiment, the deviation index may include a ranking out of five stars, out of a scale of 1-10 or 1-100, a percentage score, and the like. Alternatively, or additionally, the deviation index may be an alphabetic score, such as, but not limited to, "A+," "A," "A−," "B+," "B," "B−," "C+," "C," "C−," "D+," "D," "D−," "F," and the like. Additionally or alternatively, deviation index may be may determined using a deviation index machine-learning module, where deviation index machine-learning module generates a deviation index machine-learning model using deviation index training data which may be inputted by a user or provided from a database 136. Deviation index machine-learning module may be generated using methods described in this disclosure. For example, and without limitation, deviation index machine-learning model may be generated using deviation training data including inputs, such as projected transportation data 124 and progress data, correlated to outputs, such as a deviation index. Such training data may be used to determine a correlation between projected transportation data 124, progress data, and deviation index, and may be used to train deviation index machine-learning model.

With further reference to FIG. 1, additionally or alternatively, determining the updated transport schedule as a function of the projected transportation data and the progress data may comprise comparing the deviation index to a deviation threshold. As used in this disclosure, "deviation threshold" is a value for an allowable amount of deviation of a transport before intervention is needed. In an embodiment, the deviation threshold comprises a predetermined deviation of time between the projected transportation data 124 and the progress data. Additionally, or alternatively, in an embodiment, deviation threshold may include a set number of transport vehicles to be used from origin to destination. In one or embodiments, deviation thresholds may be provided by a database of apparatus 100 or third party application. In various embodiments, deviation thresholds may be inputted into computing device 104 by a user using, such as, for example, a peripheral input device (e.g., keyboard) or an integrated input component (e.g., touchscreen of computing device). For example, and without limitation, a user may input deviation thresholds into apparatus 100 via graphical user interface or web application using a keyboard. In other embodiments, deviation thresholds may be provided from historical data, such as data collected by sensors or past recorded data related to similar shipments. For example, and without limitation, one or more sensors communicatively connected to apparatus 100 may detect mileage data (e.g., a mileage) of a vehicle and transmit the data to apparatus 100 for storage in database. In other embodiments, deviation thresholds may be retrieved from a remote database, such as, for example, a website, academic database, government database, or the like. In other embodiments, deviation thresholds may be provided using a deviation machine-learning module, where deviation threshold machine-learning module generates a deviation threshold machine-learning model using deviation threshold training data which may be inputted by a user or provided from a database 136. Deviation threshold machine-learning module may be generated using methods described in this disclosure. For example, and without limitation, deviation threshold machine-learning model may be generated using inputs, such as projected transportation data 124 and progress data, correlated to outputs, such as a deviation threshold data. Such training data may be used to determine a correlation between projected transportation data 124, progress data, and deviation threshold, and may be used to train deviation threshold machine-learning model.

Continuing to reference FIG. 1, additionally or alternatively, processor 104 may be configured to generate a deviation notification to the user as a function of comparing the deviation index to a deviation threshold. In an exemplary embodiment, processor 104 may be configured to generate deviation notification when the deviation index exceeds the deviation threshold. Such a deviation notification may be configured to notify a user that a transport has exceeded an allowable amount of deviation of a transport and/or an issue with the transport exists and may need to be addressed. In an embodiment, deviation notification may be an audiovisual alert, text-based alert, and the like.

With further reference to FIG. 1, in an embodiment, determining the updated transport schedule as a function of the projected transportation data and the progress data may comprise generating a transportation report for at least one stage of the plurality of stages for the projected transport schedule. In an embodiment, the transportation report may include projected transportation data 124 such as time data, vehicle data, rate data, geographical data, condition data, and the like, as described above. The transportation report may include information about a projected route, estimated time of arrival, and the like. Additionally, or alternatively, the transportation report may be generated based on the comparing of the deviation index to the deviation threshold. For example, transportation report may include information about what factors contributed to an increased deviation index, potential resolutions to address these factors, and the like.

With continued reference to FIG. 1, determining the updated transport schedule as a function of the projected transportation data and the progress data may comprise determining updated resource requirement data for the updated transport schedule 144. As used in this disclosure, "updated resource requirement" is a recalculated need for certain resources for transportation of the transport. For example, updated resource requirement may be a number of vehicles/operators needed on the delivery and/or pickup side of a transport, capacity on a vehicle, type of shipments, special equipment needs (e.g., heated trailer, refrigerated trailer, load instructions, etc.), and the like. For example, processor 104 may be configured to generate updated resource requirement based on the updated transport schedule. In an exemplary embodiment, processor 104 may be configured to determine an increased need for fuel if an updated transport schedule includes an increased distance to travel. In a further exemplary embodiment, processor 104 may be configured to determine a different transport vehicle needed for a new route to be traveled. In an embodiment, processor 104 may be configured to determine updated resource requirement for each stage of a plurality of stages for the updated transport schedule. Additionally, or alternatively, determining updated resource requirement data for the updated transport schedule 144 may comprise determining the updated resource requirement data using a machine learning model.

With further reference to FIG. 1, determining the updated resource requirement data using a machine learning model may include receiving updated resource requirement training data. In an embodiment, updated resource requirement training data may include a plurality of transport data and progress data that are correlated to one of a plurality of updated transport resource requirements. For example, updated resource requirement training data may be used to show transport data that may indicate a particular updated resource requirement. In an exemplary embodiment, an updated resource requirement may be a smaller vehicle capacity for a reduced transport, additional operators, and the like. In a further embodiment, projected transport schedule training data may also include a plurality of updated transport data and correlated progress data that are correlated to one of a plurality of updated resource requirement data. In such an embodiment, updated resource requirement training data may be used to show how transport data and correlated updated transport schedule may indicate a particular updated resource requirement. Determining the updated transport schedule using a machine learning model may further include training a resource requirement machine learning model as a function of updated resource requirement training data. Further, determining updated resource requirement using a machine learning model may also include determining the updated resource requirement using trained resource requirement machine learning model.

With continued reference to FIG. 1, processor 104 may be configured to generate a user interface data structure 148 including the updated transport schedule and the progress data. As used in this disclosure, "user interface data structure" is a data structure representing a specialized formatting of data on a computer so that the information can be organized, processed, stored, and retrieved quickly and effectively for a user interface. Additionally, or alternatively, the processor 104 may be configured to generate the user interface data structure 148 including any combination of progress data 140, projected transportation data 124, updated transport schedule data 144, and deviation notification. The user interface data structure 148 may allow any of the progress data 140, projected transportation data 124, updated transport schedule data 144, and deviation notification to be displayed on a display, graphical user interface, and the like. Further, processor 104 is configured to transmit the user interface data structure 148 to be displayed by a display, graphical user interface, and the like on a remote device and/or user device. Each of the progress data 140, projected transportation data 124, updated transport schedule data 144, and deviation notification may be reviewed by a user and/or any other associated users to review and manage progress of and information about transports and identify any potential issues associated with these transports.

With further reference to FIG. 1, transmitting the updated transport schedule and the user interface data structure 148 may comprise processor 104 storing at least one of the projected transportation data 124, the updated transport schedule 144, and progress data 140 on an immutable sequential listing 152, such as immutable sequential listing 200. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. For example, the updated transport schedule 144 may be configured into at least one block of data to be stored on the immutable sequential listing 152. As describe herein, an immutable sequential listing 152 may include and/or implement an immutable ledger, where data entries that have been posted to immutable sequential listing 152 cannot be altered. Data elements are listings in immutable sequential listing 152; data elements may include any form of data, including transportation data 124, the updated transport schedule 144, and progress data 140, textual data, image data, encrypted data, cryptographically hashed data, and the like.

Continuing to refer to FIG. 1, processor 104 is connected to a graphical user interface (GUI) 156 configured to display any information from apparatus 100 and/or any computing device. As used in the current disclosure, a "graphical user interface" may include a plurality of lines, images, symbols. GUI 156 may be displayed on a display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time. GUI 156 may be configured to receive user input. A "user input" as used in this disclosure is information received from an individual. User input may include, for instance and without limitation, information entered via text fields, information entered via clicking on icons of a graphical user interface (GUI), information entered via touch input received through one or more touch screens, and the like.

With further reference to FIG. 1, GUI 156 may be configured to receive the user interface data structure including the updated transport schedule 144 and the progress data 140. Additionally, or alternatively, GUI 156 may be configured to display any of the progress data 140, projected transportation data 124, updated transport schedule 144, and deviation notification as a function of the user interface data structure for review by a user to gather information about transport progress and potential issues associated with any transports.

Continuing to reference FIG. 1, GUI 156 may be configured to receive a user input related to any of the progress data 140, projected transportation data 124, updated transport schedule data 144, and deviation notification. In an embodiment, GUI 156 may be configured to receive a user input that comprises a management action for any of the progress data 140, projected transportation data 124, updated transport schedule data 144, and deviation notification. A "user input" as used in this disclosure is information received from an individual. User input may include, for instance and without limitation, information entered via text fields, information entered via clicking on icons of a graphical user interface (GUI), information entered via touch input received through one or more touch screens, and the like. As used in this disclosure, a "management action" is any requested change to any of the progress data 140, projected transportation data 124, updated transport schedule data 144, and deviation notification. For example, a management action may be changing a transportation vehicle, adjusting certain portions of the projected transportation data, and the like. Further, processor 104 may be configured to receive and implement the management action within any of the progress data 140, projected transportation data 124, updated transport schedule data 144, and deviation notification and adjust any of the progress data 140, projected transportation data 124, updated transport schedule data 144, and deviation notification based on the management action.

Figure 2:
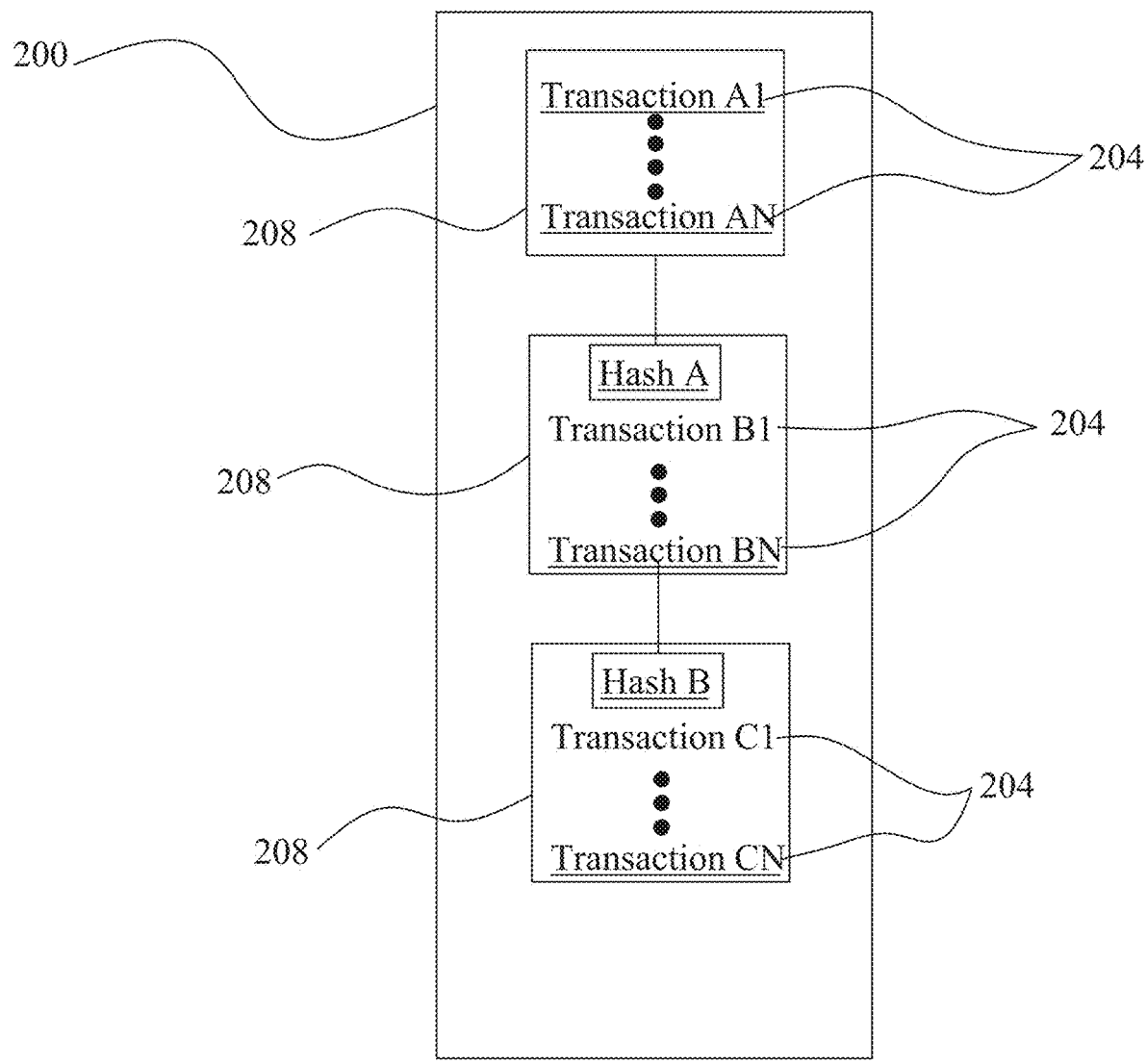
FIG. 2 is a block diagram of exemplary embodiment of an immutable sequential listing in accordance with one or more embodiments of the present disclosure.

Referring now to FIG. 2, an exemplary embodiment of an immutable sequential listing is illustrated 200. An immutable sequential listing 200 may be, include and/or implement an immutable ledger, where data entries that have been posted to immutable sequential listing 200 cannot be altered. Data elements are listing in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as crypto currency, as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2, immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. Immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in immutable sequential listing 200.

Still referring to FIG. 2, additional data linked to at least a posted content may be incorporated in sub-listings 208 in immutable sequential listing 200; for instance, data may be incorporated in one or more fields recognized by block chain protocols that permit a person or computer forming a at least a posted content to insert additional data in immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a posted content as described above.

Figure 3:
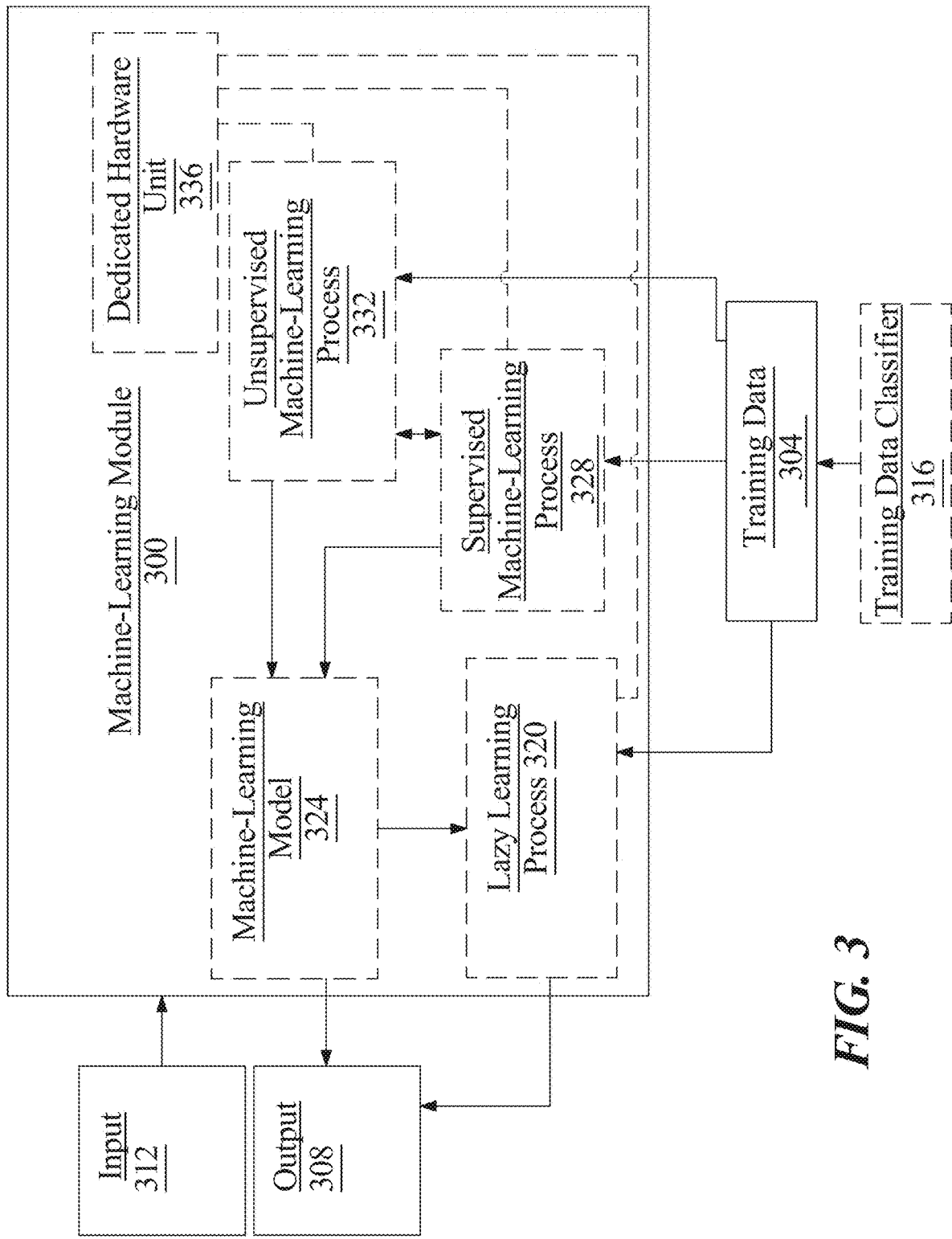
FIG. 3 is a block diagram of exemplary embodiment of a machine learning module in accordance with one or more embodiments of the present disclosure.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include inputs such as transport request, transport data and the like wherein outputs may include outputs such as projected transport schedule.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to cities, regions, geographical areas, seasons and the like. In an embodiments, each categorization may include their own correlated outputs. In an embodiment, training data classifier may be used to ensure that outputs from differing categorizations are not mixed.

Still referring to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25$^{th}$ percentile value and the 50$^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as transport data, transport request and the like as described above as inputs, outputs such as projected transport data as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
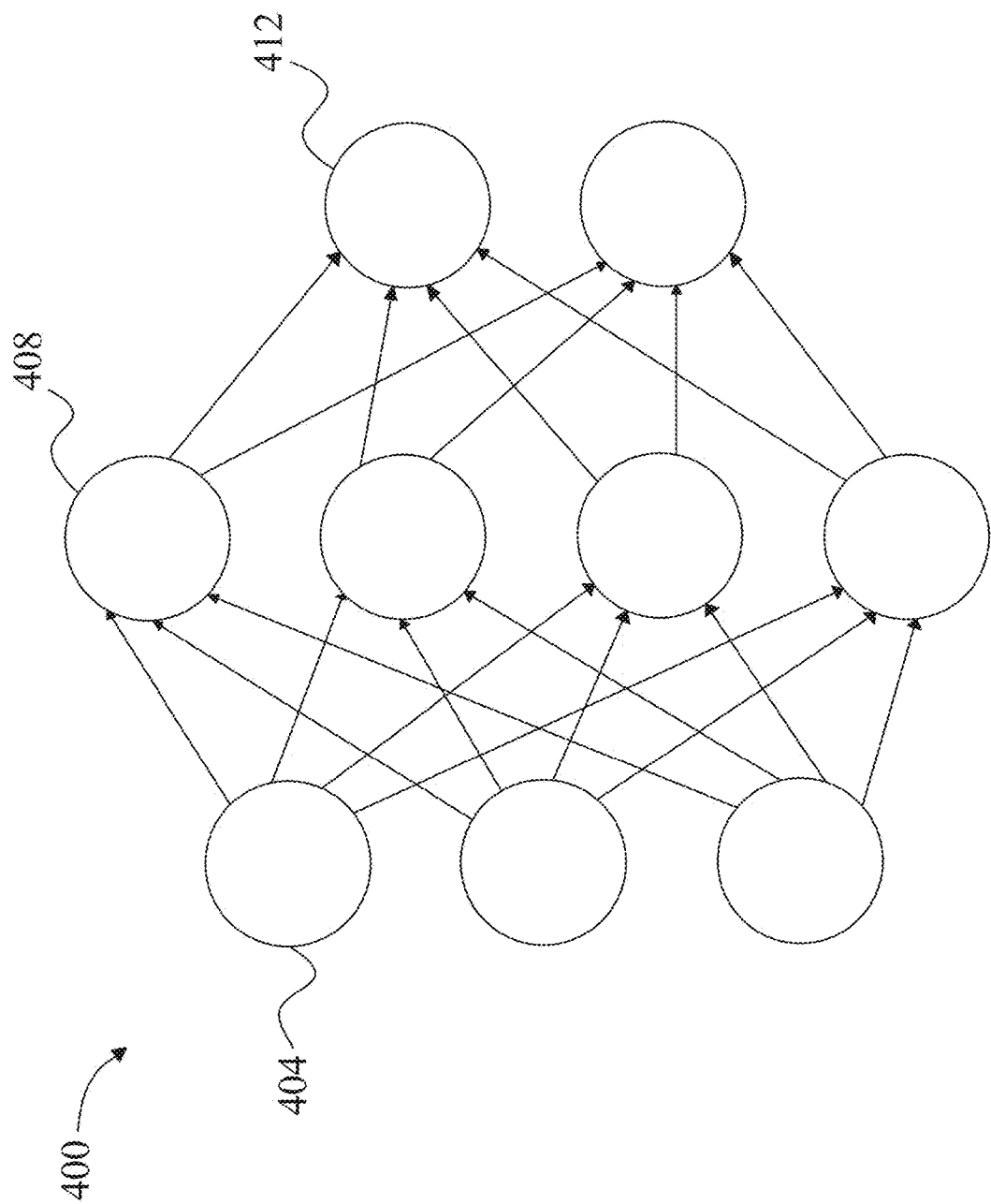
FIG. 4 is a diagram of an exemplary nodal network in accordance with one or more embodiments of the present disclosure.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
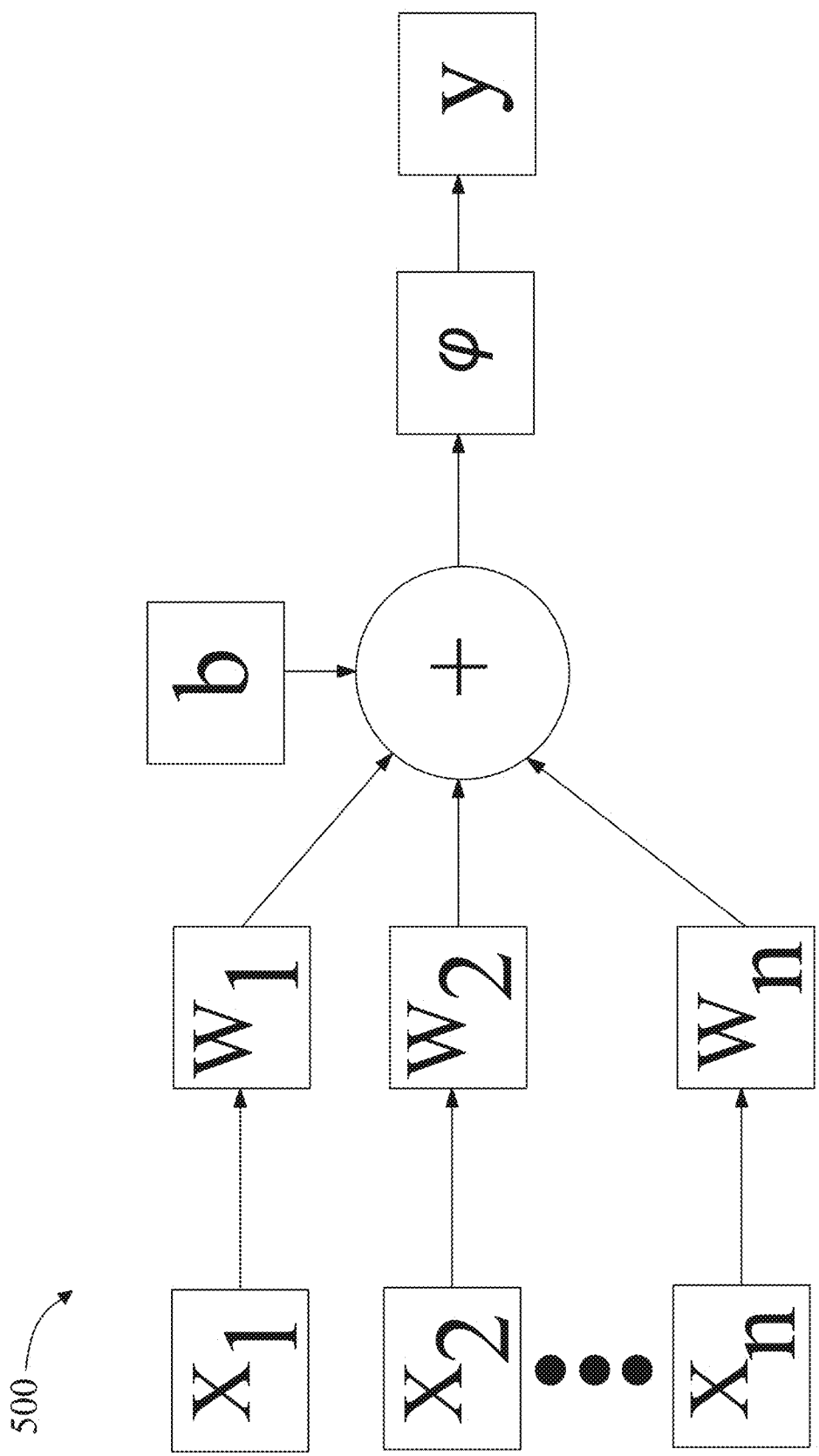
FIG. 5 is a block diagram of an exemplary node in accordance with one or more embodiments of the present disclosure.

Referring now to FIG. 5, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
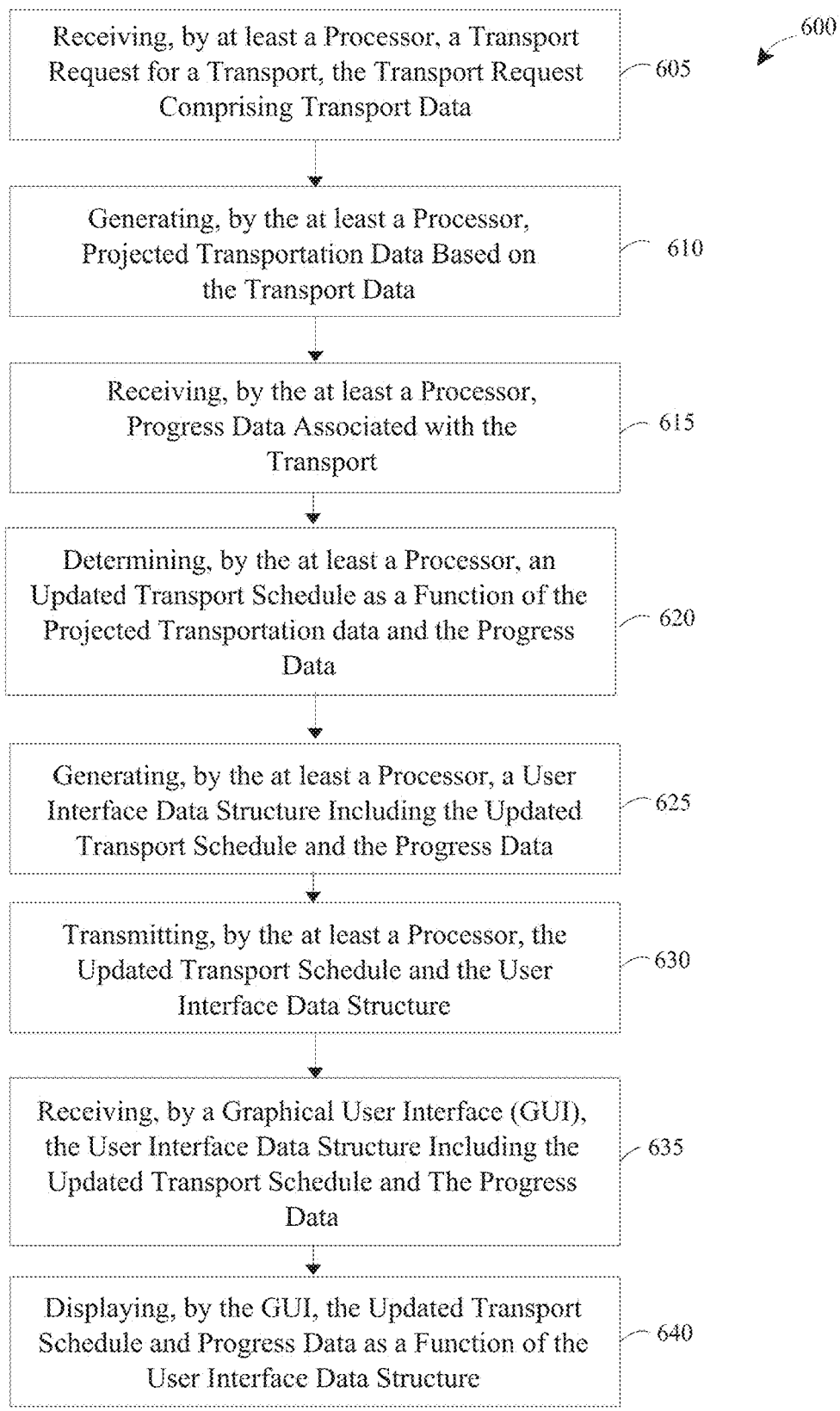
FIG. 6 is a flow diagram illustrating an exemplary embodiment of a method for line haul logistics management in accordance with one or more embodiments of the present disclosure.

Referring now to FIG. 6, a flow diagram of an exemplary method 600 for line haul logistics management is illustrated. At step 605, method 600 includes receiving, by at least a processor, a transport request for a transport, the transport request comprising transport data associated with the transport and the transport request. This may be implemented as described and with reference to FIGS. 1-6.

With continued reference to FIG. 6, at step 610, method 600 includes generating, by the at least a processor, projected transportation data based on the transport data. In an embodiment, generating the projected transportation data may comprise determining, by the at least a processor, a projected transport schedule for the transport request and the transport. Additionally or alternatively, determining the projected transport schedule for the transport request and the transport may comprise determining, by the at least a processor, the projected transport schedule using a projected transport schedule machine learning model. In an embodiment, the projected transport schedule may comprise a plurality of stages. Further, generating the projected transportation data may comprise generating, by the at least a processor, a transportation report for at least one stage of the plurality of stages for the projected transport schedule. Additionally, generating the projected transportation data may comprise determining, by the at least a processor, projected resource requirement data for the transport request and the transport. In an embodiment, determining the projected resource requirement data for the transport request and the transport may comprise determining, by the at least processor, the projected resource requirement data for at least one stage of the plurality of stages for the projected transport schedule These may be implemented as described and with reference to FIGS. 1-6.

With further reference to FIG. 6, at step 615, method 600 includes determining, by the at least a processor, an updated transport schedule as a function of the projected transportation data. In an embodiment, determining the updated transport schedule may comprise comparing, by the at least a processor, the projected transportation data 124 and the progress data, determining, by the at least a processor, a deviation index based on the comparison of the transport data and the progress data and comparing, by the at least a processor, transport data to a deviation threshold. In a further embodiment, the deviation threshold may comprise a predetermined deviation of time between the transport data and the predetermined data. Additionally or alternatively, determining the updated transport schedule as a function of the projected transportation data and the progress data may comprise generating, by the at least a processor, a transportation report for at least one stage of the plurality of stages for the projected transport schedule. In an embodiment, determining the updated transport schedule as a function of the projected transportation data and the progress data may comprise determining, by the at least a processor, updated resource requirement for the updated transport schedule. These may be implemented as described and with reference to FIGS. 1-6.

Still referring to FIG. 6, at step 620, method 600 includes generating, by the at least a processor, a user interface data structure including the automated transport schedule and the projected transportation data. This may be implemented as described and with reference to FIGS. 1-6.

Continuing to refer to FIG. 6, at step 625, method 600 includes transmitting, by the at least a processor, the updated transport schedule and the user interface data structure. In an embodiment, transmitting the updated transport schedule and the user interface data structure may comprise storing, by the at least a processor, at least one of the projected transportation data, the updated transport schedule, and progress data on an immutable sequential listing. These may be implemented as described and with reference to FIGS. 1-6.

With further reference to FIG. 6, at step 630, method 600 includes receiving, by a graphical user interface (GUI), the user interface data structure including the updated transport schedule and the progress data. This may be implemented as described and with reference to FIGS. 1-6.

With continued reference to FIG. 6, at step 635, method 600 includes displaying, by the GUI, the automated transport as a function of the user interface data structure. This may be implemented as described and with reference to FIGS. 1-6.

Still referring to FIG. 6, method 600 may further include tracking, by the at least a processor, a movement of the transport along the projected transport schedule. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
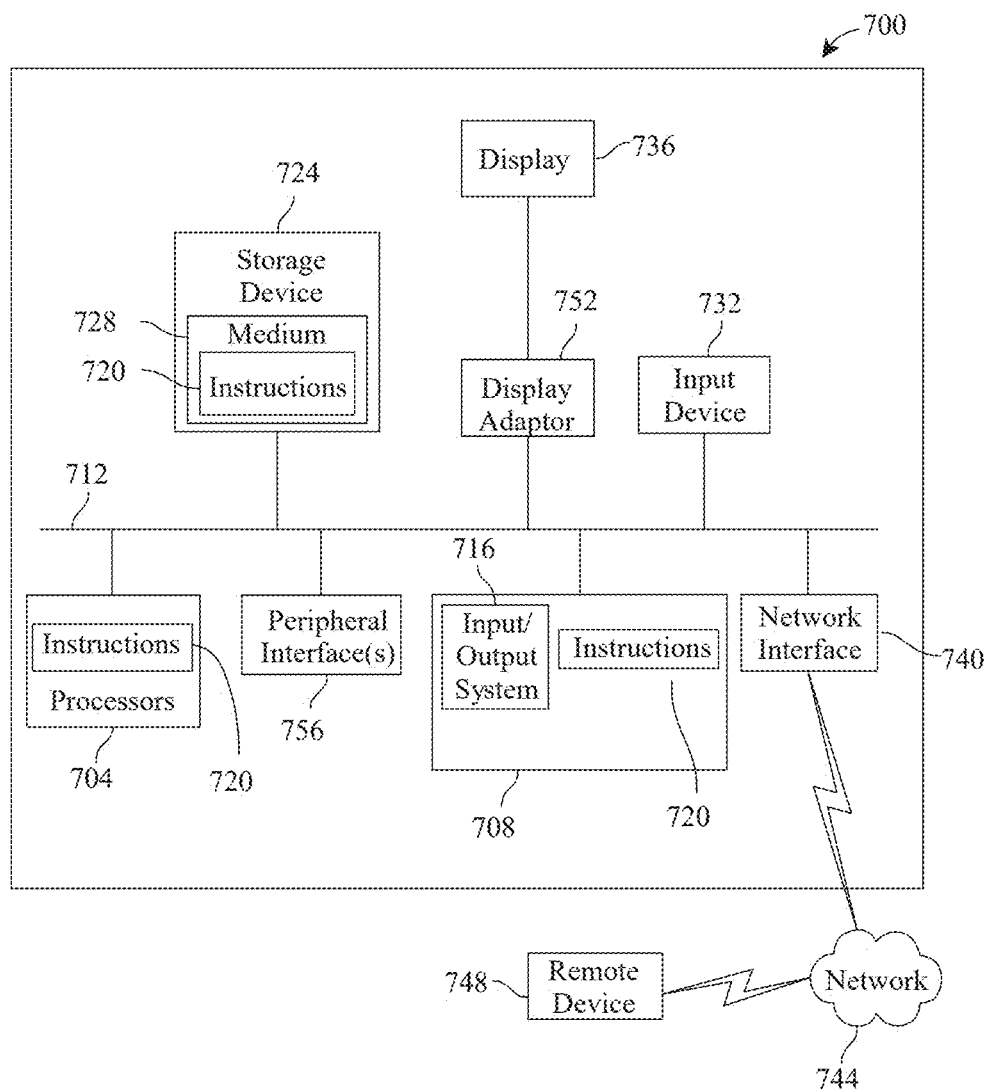
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for line haul logistics management, the apparatus comprising:
    at least a processor;
    a memory communicatively connected to the at least a processor, the memory comprising instructions configuring the at least a processor to:
        receive a transport request for a transport, the transport request comprising transport data associated with the transport and the transport request;
        generate projected transportation data based on the transport data, wherein generating the projected transportation data comprises determining a projected transport schedule for the transport request and the transport utilizing a projected transport schedule machine learning model which further comprises:
            receiving projected transport schedule training data comprising a plurality of transport data correlated to a plurality of projected transport schedule data;
            sanitize the projected transport schedule training data using a dedicated hardware unit comprising circuitry configured to perform signal processing operations, wherein sanitizing the projected transport schedule training data comprises:
                determining by the dedicated hardware unit that a training data entry of the projected transport schedule training data has a signal to noise ratio below a threshold value; and removing the training data entry from the projected transport schedule training data to create sanitized projected transport schedule training data;
training the projected transport schedule machine learning model using the sanitized projected transport schedule training data;
generating the projected transport schedule using the trained projected transport schedule machine learning model;
receive progress data associated with the transport;
calculate a deviation index based on the projected transportation data and the progress data, wherein calculating the deviation index comprises:
comparing the projected transportation data and the progress data;
determining the deviation index based on the comparison of the projected transportation data and the progress data;
determining a deviation threshold by:
receiving deviation threshold data comprising historical sensor data related to mileage data;
training a deviation threshold machine-learning model with deviation threshold training data comprising deviation indexes correlated to a plurality of deviation threshold data; and
outputting the deviation threshold; and
comparing the deviation index to the deviation threshold;
determine an updated transport schedule as a function of the deviation index;
receive a zero-knowledge proof demonstrating possession of authorization data associated with a user computing device communicatively connected to the at least a processor, from the user computing device, wherein the zero-knowledge proof is generated using a prover algorithm operating on at least a device-specific secret;
verify the zero-knowledge proof using a verifier algorithm to confirm possession of the authorization data without revealing the device-specific secret; and
in response to the verification:
generate a user interface data structure, wherein the user interface data structure comprises the updated transport schedule and the progress data; and
transmit the updated transport schedule and the user interface data structure to the user computing device; and
the user computing device, the user computing device configured to:
perform the generation of the zero-knowledge proof using the prover algorithm operating on at least the device-specific secret;
transmit the zero-knowledge proof to the at least a processor;
receive the user interface data structure from the at least a processor; and
display the updated transport schedule and the progress data as a function of the user interface data structure.

2. The apparatus of claim 1, wherein the deviation threshold comprises a predetermined deviation of time between the projected transportation data and the progress data.

3. The apparatus of claim 1, wherein the projected transport schedule comprises a plurality of stages.

4. The apparatus of claim 3, wherein determining the updated transport schedule as a function of the projected transportation data and the progress data comprises generating a transportation report for at least one stage of the plurality of stages for the projected transport schedule.

5. The apparatus of claim 1, wherein determining the updated transport schedule as a function of the projected transportation data and the progress data comprises determining an updated resource requirement for the updated transport schedule.

6. The apparatus of claim 5, wherein determining the updated resource requirement for the updated transport schedule comprises determining the updated resource requirement for at least one stage of a plurality of stages for the updated transport schedule.

7. The apparatus of claim 1, wherein, before receiving the zero-knowledge proof from the user computing device, storing at least one of the projected transportation data, the updated transport schedule, and the progress data on an immutable sequential listing.

8. A method for line haul logistics management, the method comprising:
receiving, by at least a processor, a transport request for a transport, the transport request comprising transport data;
generating, by the at least a processor, projected transportation data based on the transport data, wherein generating the projected transportation data comprises determining a projected transport schedule for the transport request and the transport utilizing a projected transport schedule machine learning model which further comprises:
receiving, by the at least a processor, projected transport schedule training data comprising a plurality of transport data correlated to a plurality of projected transport schedule data;
sanitize the projected transport schedule training data using a dedicated hardware unit comprising circuitry configured to perform signal processing operations, wherein sanitizing the projected transport schedule training data comprises:
determining by the dedicated hardware unit that a training data entry of the projected transport schedule training data has a signal to noise ratio below a threshold value; and
removing the training data entry from the projected transport schedule training data to create sanitized projected transport schedule training data;
training, by the at least a processor, the projected transport schedule machine learning model using the sanitized projected transport schedule training data; and
generating, by the at least a processor, the projected transport schedule using the trained projected transport schedule machine learning model;
receiving, by the at least a processor, progress data associated with the transport;
calculating, by the at least a processor, a deviation index based on the projected transportation data and the progress data, wherein calculating the deviation index comprises:
comparing the projected transportation data and the progress data;
determining the deviation index based on the comparison of the projected transportation data and the progress data;
determining a deviation threshold by:

receiving deviation threshold data comprising historical sensor data related to mileage data;
training a deviation threshold machine-learning model with deviation threshold training data comprising deviation indexes correlated to a plurality of deviation threshold data; and
outputting the deviation threshold; and
comparing the deviation index to the deviation threshold;
determining, by the at least a processor, an updated transport schedule as a function of the deviation index;
receiving, by the at least a processor, a zero-knowledge proof demonstrating possession of authorization data associated with a user computing device communicatively connected to the at least a processor, from the user computing device, wherein the zero-knowledge proof is generated using a prover algorithm operating on at least a device-specific secret;
verifying, by the at least processor, the zero-knowledge proof using a verifier algorithm to confirm possession of the authorization data without revealing the device-specific secret; and
in response to the verification:
generating, by the at least a processor, a user interface data structure, wherein the user interface data structure comprises the updated transport schedule and the progress data; and
transmitting, by the at least a processor, the updated transport schedule and the user interface data structure to the user computing device;
performing, by the user computing device, the generation of the zero-knowledge proof using the prover algorithm operating on at least the device-specific secret;
transmitting, by the user computing device, the zero-knowledge proof to the at least a processor;
receiving, by the user computing device, the user interface data structure from the at least a processor; and
displaying, by the user computing device, the updated transport schedule and the progress data as a function of the user interface data structure.

9. The method of claim 8, wherein the deviation threshold comprises a predetermined deviation of time between the projected transportation data and the progress data.

10. The method of claim 8, wherein the projected transport schedule comprises a plurality of stages.

11. The method of claim 10, wherein determining the updated transport schedule as a function of the projected transportation data and the progress data comprises generating, by the at least a processor, a transportation report for at least one stage of the plurality of stages for the projected transport schedule.

12. The method of claim 8, wherein determining the updated transport schedule as a function of the projected transportation data and the progress data comprises determining, by the at least a processor, updated resource requirement for the updated transport schedule.

13. The method of claim 12, wherein determining the updated resource requirement for the updated transport schedule comprises determining, by the at least a processor, the updated resource requirement for at least one stage of a plurality of stages for the updated transport schedule.

14. The method of claim 8, wherein, before receiving the zero-knowledge proof from the user computing device, storing, by the at least a processor, at least one of the projected transportation data, the updated transport schedule, and the progress data on an immutable sequential listing.

* * * * *